United States Patent [19]

Sheu et al.

[11] Patent Number: 5,025,547
[45] Date of Patent: Jun. 25, 1991

[54] METHOD OF PROVIDING TEXTURES ON MATERIAL BY ROLLING

[75] Inventors: Shen Sheu, Murrysville; Louis G. Hector, Monroeville, both of Pa.

[73] Assignee: Aluminum Company of America, Pittsburgh, Pa.

[21] Appl. No.: 520,307

[22] Filed: May 7, 1990

[51] Int. Cl.$^5$ .............................................. B23P 25/00
[52] U.S. Cl. .................. 29/527.4; 29/121.1; 29/121.2; 29/895.3
[58] Field of Search ............... 29/895, 895.1, 895.3, 29/895.32, 895.33, 121.1, 121.2, 121.3, 121.8, 520.2, 527.3, 527.4

[56] References Cited

U.S. PATENT DOCUMENTS

| | | | |
|---|---|---|---|
| 3,613,319 | 10/1971 | Takimura et al. | 29/895.3 X |
| 3,619,881 | 11/1971 | Bills et al. | 29/121.8 |
| 4,452,647 | 6/1984 | Sailas | 29/895.3 |
| 4,794,680 | 1/1989 | Meyerhoff et al. | 29/121.1 X |
| 4,841,611 | 6/1989 | Kusaba et al. | 29/121.1 X |
| 4,850,089 | 7/1989 | Monfort et al. | 29/121.1 X |

Primary Examiner—Carl J. Arbes
Attorney, Agent, or Firm—Elroy Strickland

[57] ABSTRACT

A method of rolling metal in a plurality of rolling stands with each of the stands having two or more rolls. The method includes first polishing the surfaces of the rolls to a mirror finish, after which the roll surfaces are textured with a plurality of minute micron size craters. The roll surface and craters are then coated with a dense, hard material before the rolls are lubricated and used to reduce the thickness of the metal in the stands. To this end, the metal is directed through the stands, the craters being capable of retaining and carrying lubricant into the bites of all of the rolls without substantial adherence of metal to the roll surfaces and without substantial generation of wear debris on the surfaces of the rolls and rolled material.

10 Claims, 2 Drawing Sheets

METHOD OF PROVIDING TEXTURES ON MATERIAL BY ROLLING

BACKGROUND OF THE INVENTION

The present invention relates generally to rolling metal plate, strip and foil, and particularly to a tooling surface finishing process that provides both the work rolls and backup rolls in each stand of a rolling operation with micro-engineered surface textures and coating material. The surface textures and coating material act to minimize the generation of wear debris, provide sufficient rolling traction and control frictional forces by ensuring adequate lubrication in the tooling/workpiece interface. The tooling surface finishing process begins with those rolls used in a reversing (breakdown) mill, that prepares an ingot for further hot and cold rolling by reducing its thickness, and ends with those rolls used in the last stand of a cold rolling mill or foil mill.

With reference to traction, a certain minimum traction is necessary between the work rolls of a mill and plate, strip or foil being rolled to achieve desired reductions in the thickness of the rolled material (i.e., the plate, strip or foil). Traction between back-up rolls and work rolls and between work rolls and the rolled material is problematic since, with liquid lubrication and highly polished rolls, slipping tends to occur between the back-up rolls and the work rolls as well as between the work rolls and rolled material. If the surfaces of ground and chrome plated rolls are rough to the extent that substantial traction is assured, then the rolls will tend to micro-machine the surface of the material being rolled by dislodging material from the rolled surface. This machined material is comprised of metal and hard metal oxide particles which collect on the surface of the rolled material. This is a particularly tenacious problem with aluminum plate, strip or foil since the relatively hard aluminum oxide particles machined from the surface of the rolled material embed themselves into the softer (nascent or un-oxidized) aluminum which can then adhere or back-extrude into the texture of the roll surface producing a roll coating effect. This leads to a continuation of the re-transfer process of hard particles from the roll to the rolled material surface.

The previously mentioned problems attain an even greater significance in a tandem rolling mill with conventionally ground rolls. The individual stands in a tandem rolling mill generally use a single coolant-lubricant which coolant-lubricant is filtered at a single lubricant cleaning location, often referred to as an "oil house." With the generation of excessive quantities of wear debris, the filtering demands on the oil house are substantially increased.

An additional aspect of the tandem mill is the differing lubrication conditions which exist within each stand. These differences in lubrication conditions between individual stands arise from the differing rolls speeds, temperatures, reduction ratios, material thicknesses and front/back tensions applied to the rolled material in each stand. The difference in lubrication conditions are not caused by the use of different coolant/lubricant systems. Rather, the physical and chemical properties of the coolant/lubricant are the same across the mill; one way to change the lubrication conditions in each stand is to optimize the texture of the roll surfaces for that stand.

Difficulties in rolling aluminum arise in part because of the tendency of nascent aluminum to adhere to the roll surfaces. Adhesion is especially pronounced when there is an inadequate amount of lubricant in the roll bite, the quality of the lubricant is poor and the roll surface roughness is such that it contributes to the adhesion problem by ploughing the worked material surface and retaining a small portion of the material. Since the aluminum surface itself is soft, adhesion to the roll surface with subsequent re-transfer of the adhered material to the surface of the rolled material results in severe surface damage to the rolled material in the form of rolled-in dirt and/or black surface streaks which are a mixture of aluminum wear debris and lubricant residue. The rolled material will, therefore, have little market value and must be relegated to scrap, with subsequent recycling. The roll surfaces must be refinished to remove adhered material in order to ensure the surface quality of rolled material in future operations.

In the operation of continuous hot mills and reversing (breakdown) mills, proper lubrication conditions are very difficult to achieve and excessive wear debris transfer to the work roll surface is the rule due to high roll surface and rolled material surface temperatures. The extreme temperatures cause partial evaporation of the lubricant prior to its entering the roll bite. A resulting vapor layer prevents oil "plate-out" on the roll surface. This promotes decomposition of organic lubricant inside the roll bite and subsequently leads to rupture of protecting boundary films on the roll surface. Excessive wear debris transfer is also due to lower rolling speeds, higher roll surface roughness and the substantial thickness reductions of the rolled material. When combined, these factors preclude a hydrodynamic effect and lead to elevated interface pressures, temperatures, high micromachining of the strip surface and an extension of the length of contact between the roll and rolled material in the roll bite. Auxiliary equipment, such as scratch brushes, must be employed to remove metal transferred to the roll surfaces. Failure to remove the transferred material results in substantial metal re-transfer to the rolled material surface, as discussed above. Additional steps, such as the use of a scratch brush, contribute to the mechanical intensity (i.e. another process step and apparatus) of the hot rolling operation, and increase rolling costs.

Severe roll wear between work rolls and backup rolls due to three body abrasion and localized plastic deformation occurs at the location where the largest wear particles preside. This requires redressing of the rolls surfaces which leads to costly down time and an excessive inventory of ground rolls.

All of the previously discussed problems pertaining to the rolling operation may be attributed to current roll shop finishing operations, which generally involve one or more grinding operations. Since grinding is a stochastic process which produces a random surface roughness on the rolls, a roll surface will be unable to properly mitigate lubricant rheology and friction in the roll bite.

SUMMARY OF THE INVENTION

It is therefore a primary objective of the present invention to provide a roll surface finishing scheme which is flexible enough to accommodate the differences in lubrication conditions in each stand of a commercial rolling mill, starting from the reversing mill and ending with the final stand of the cold rolling mill, such that a roll surface finish is produced that adequately mitigates friction, lubrication and wear in a given stand of the mill.

The above objective is accomplished through three individual steps into which the surface finishing scheme is divided. In the first step, which is a pre-processing step, the roll surface is polished/ground to a mirror finish, i.e., a finish that has an average surface roughness of less than 0.3 microns, and preferably falling in the micron range of up to 0.1 micron. In the second step, which is a direct processing step, the roll surface is provided with a texture of micron-size discrete indentations or craters, with a possible exception of that roll to be used in the final (cold) rolling stand. An individual crater possesses an annular lip along its bank. The lip is formed from a combination of the locally melted substrate which is raised due to the pressure from a focused energy beam device and/or gas assist, if one is used, and the subsequent deposition of evaporated or vaporized material. The physical dimensions of the lip, i.e., diameter and height, are contingent upon the technique used to process the crater, which technique generally involves a focused energy beam device such as a laser or electron beam. For rolls employed in the earlier stands of the hot rolling process, the lips are partially removed, i.e., the vaporized deposition, which generally forms a weak metallurgical bond to the roll surface, is removed completely, leaving only a slight raised portion due to the melted substrate. The raised portions provide the needed traction in the earlier stands of hot rolling where very thick gauge materials are rolled. For rolls employed in the later stands of hot rolling or earlier stands of cold rolling, the lips are substantially removed leaving depressions in the roll surface. The removal process involves a polishing operation. Both textual configurations serve to draw more lubricant into the hot or cold rolling roll bite and effectively lubricate the roll/sheet surface conjunction and at the same time provide the needed traction.

The third and final step of the surface finishing process involves the aforementioned polishing process followed by the application of a hard surface coating material which is compliant to the local surface texture of the roll. In the case of the latter stands of the cold rolling process, the vaporized deposition portion of the crater lip is removed by a polishing process leaving the melted portion of the crater lip. The size of the crater, i.e., diameter and depth, on a roll in a latter stand of the cold rolling process, is smaller than that on a hot roll. The polishing operation leaves a very slight annular lip along the bank of the crater.

The crater polishing and coating operations are such that the remaining portion of a crater lip has a very shallow slope, the slope falling in the range of less than 25° with respect to the nominal roll surface for differing applications. When these shallow lips enter the roll bite, the lips gently "plow" into the cooperating surfaces of the roll and rolled material to provide traction sufficient to prevent slipping but without generating excessive wear debris, as is the case with ground rolls. The depressions will provide sufficient lubricant in the roll bite to prevent adhesion of rolled material to the work roll surface. The lips, in turn, form micron-sized depressions in the surface of the rolled material, which depressions will retain small amounts of lubricant in future metal forming operations, which includes further rolling of the rolled material in a next stand, as well as deep drawing and ironing, and stamping of the rolled material, for example.

With the lessening of wear debris generation in the roll bite, the rolled product and the rolls remain cleaner and the surface quality of the final rolled product is greater than with conventional roll grinding practices.

The rolls of the final stand or stands of the cold rolling operation can be provided with the helical groove, instead of craters, described in pending U.S. Pat. Application Ser. No. 342,300, filed on Apr. 24, 1989 in the names of present inventors. The disclosure of this application is incorporated herein by reference, as if set forth in its entirety herein.

The micron-sized craters can be created by a narrow, highly focused electron beam or laser beam, the average diameter of the crater generally being a few multiples of the width of the electron beam or wavelength of the laser radiation. The impact of the electrons comprising the electron beam or absorption of electromagnetic radiation by the surface layer of the roll creates each crater through a combination of melting and evaporative cutting. In the course of this type of micromachining process, a fraction of the surface material is displaced onto the banks of the crater through the evaporative cutting action and a fraction is displaced through melting within the crater itself, each process contributing to the overall size of the resulting lip. The evaporated material is generally easy to remove via a light polishing operation (as part of the post-processing step) whereas the melted portion is not. Removal of the majority of the deposited materials ensures that it will not lose its desired function and consequently become wear debris during the rolling process. In addition, the coating of the roll surface with a hard, dense material coats the micron-sized indentations and the melted portion of the lip with said material such that the depth of the indentations and slope of the remaining lip is reduced.

Indentations in the roll surface can also be effected by chemical etching processes. Such processes tend not to deposit material about the banks of the indentations.

A substantial number of patents and publications have appeared in recent years directed to the use of laser devices to create micron-size craters in rolling mill rolls, in particular reference to the rolling of steel. The disclosures of these patents and publications, however, do not deal with the problem of the strong tendency of the adhesion of strip material to a steel roll surface. Such adhesion, mechanical interlocking (i.e., seizure) and back extrusion of rolled material, such as aluminum, which is softer than the steel comprising the mill rolls, and the subsequent generation of wear debris can be a particular problem when taking substantial reductions in thickness at high rolling speeds.

U.S. Pat. No. 4,806,731 to Braggard et al. is concerned with the "pulling off" of ridge material formed about indentations provided in a mill roll by an intermittent laser beam. To care for the "pull off" problem, Braggard et al. locate each ridge of material to one side of the indentation and over a heated zone of the roll surface caused by impact of the laser beam. In addition, Braggard et al. suggests the use of a second laser beam to remelt the ridge on the roll surface to control the pull off problem. There is no discussion in Braggard et al. about a pre-preparation step (i.e., polishing/grinding of the roll surface to a mirror finish) and a post preparation step, i.e, removal of vaporized deposition and the application of a subsequent hard coating to the roll surface.

It will be further noted that Braggard et al. use a $CO_2$ laser and a rotating disc to provide an intermittent beam. The diameter of a crater or depression produced by a $CO_2$ laser in theory cannot be less than 10.64 microns since this is the wavelength of light emitted by such a laser. It is possible, of course, to produce a crater or depression with a diameter larger than 10.64 microns using a few multiples of the wavelength. When aluminum sheet is rolled with a roll having a 10.64 micron or larger size roughness, the surface texture imparted to the sheet can be detected by the human eye; from the packaging customer standpoint, this is undesirable especially in the latter stands of cold rolling. Also, the size of the crater lip produced by the $CO_2$ process is likely to be unacceptable since it would generate significant wear debris in both hot and cold rolling of aluminum material.

The coupling efficiency of $CO_2$ laser energy to a mirror-finished tool steel surface is not as good as that from a frequency-doubled Nd:YAG laser, which laser produces light at a 0.532 micron wavelength. With a $CO_2$ laser, if no external coupling medium is used or if the roll surface is nearly mirror-finished, much of the $CO_2$ beam is reflected. In addition, due to poor coupling, the surface roughness produced by the $CO_2$ laser on a mirror-finished roll will be somewhat sporadic. The $CO_2$ process requires oxygen in order to produce an exothermic reaction on the roll surface to create the desired roughness. A YAG laser requires only a gas assist from a shop air line, which is less costly than using pure oxygen, and readily available in most production environments. Such gas (air) assist effectively displaces the plasma/vapor generated by beam/metal interaction and thereby prevents the plasma/vapor from scattering light, thus allowing the YAG energy to effectively couple with the mirror finished surface.

A mechanical beam chopping element, as used by Braggard et al, serves to increase somewhat the peak power of the $CO_2$ pulses, but not nearly as much as the peak pulse energies produced by a Q-switched YAG laser.

The primary purpose behind the pre-processing step that produces the mirror-finished roll surface roughness in the present invention is to minimize, as much as possible, the stochastic element in surface roughness which results from grinding. In effect, starting with a mirror-finished roll surface substantially reduces the presence of grinding marks on both the roll surface and the sheet surface. This makes both sheet surface brightness and sheet formability easier to control with the laser processed roll texture.

In addition, it will be noted that the Braggard et al. apparatus is mechanically intensive, as it involves a continuous wave laser that requires mechanical chopping. In addition, the Braggard et al. process becomes even more mechanically intensive with the use of a second laser beam to melt and weld a ridge adjacent to each crater on the roll surface.

The surface roughness provided by the Braggard et al. process may be acceptable for rolling steel, in which temper rolling at low thickness reductions under minimal lubrication conditions in a final stand is common. It is unacceptable for rolling aluminum and other light, nonferrous metals, as such metals tend to adhere to and extrude into the craters and hence are picked up by the rolls and subsequently re-transferred to the surfaces of the metal being rolled. Such problems must be carefully solved through design of the texture to be applied to the roll surface. A way to best achieve this is by properly manipulating a focused beam of energy employed to apply the surface texture, and integrating such a direct processing step into an entire surface finishing scheme which includes both the pre- and post-processing operations.

THE DRAWINGS

The invention along with its objectives and advantages will be best understood from consideration of the following detailed description and the accompanying drawings in which.

PREFERRED EMBODIMENTS

As discussed earlier, the present invention is directed to a roll surface finishing scheme that comprises three separate steps, the purpose of which is to micro-engineer the roll surfaces of each stand of a rolling mill such that the resulting roll surface is tailored to meet the needs of the lubrication conditions of that stand. The results are substantially reduced wear debris generation, and a decrease in all the problems associated with wear debris. This includes the manufacture of high quality rolled products, as the product surfaces are thereby engineered for particular end results or uses (e.g., brightness, formability, etc.).

Figure 1:
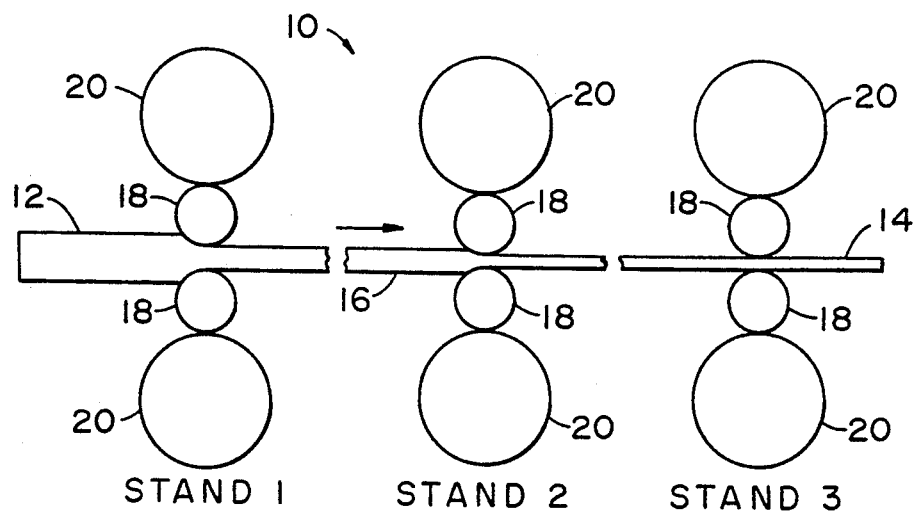
FIG. 1 is a schematic view of a rolling process employing a plurality of stands.

Referring now to FIG. 1 of the drawings, three rolling mill stands (1, 2, 3) are depicted schematically to represent all stages of a process 10 for reducing the thickness of metal material by rolling, from the breakdown of an ingot 12 in a stand 1 of the above stands, to the final pass of sheet 14 through a cold mill, which is represented by a stand 3. Hence, for purposes of the remaining discussion, stand 1 represents a reversing (breakdown) mill, stand 2 represents a hot mill, which usually includes multiple stands, to reduce the thickness of a plate 16 issuing from the breakdown process to a gauge suitable for coiling. After a coil of 16 is formed, it is transported to a cold mill (stand 3) where the coil is unwound and directed through the cold mill to further reduce its thickness.

Most mills stands include relatively small diameter work rolls 18, which diameters generally fall within the range of about ten to thirty inches, and larger diameter backup rolls 20, the diameters of which generally fall within the range of about thirty to fifty inches, though the concepts of the present invention are applicable to mill stands employing only two rolls and more than four rolls.

Figure 5:
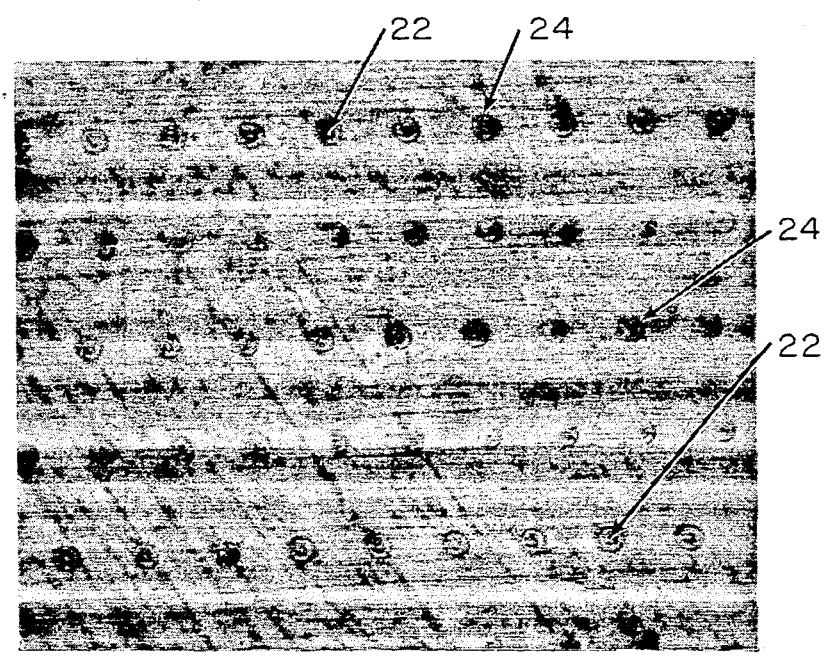
FIG. 5 is a photomicrograph of the surface of a work roll in a final stand or stands of a cold rolling operation magnified 200 times. The photomicrograph shows micron-sized craters formed by a laser device, the depth of the craters, as formed, being on the order of 3.0 microns.

Work rolls 18 and preferably backup rolls 20, in the present invention, are prepared in a manner to provide sufficient traction while simultaneously substantially minimizing the generation of wear debris. This is accomplished with a three step roll surface finishing process. In the first step of the process, a roll surface is polished or ground to the extent that its average roughness falls preferably within the range of up to 0.1 micron. In the second step of the process, the polished or ground surface is provided with micron-sized craters or depressions 22, as shown in the photomicrograph of FIG. 5 and in the sectional views of the roll portions in FIGS. 2 and 3 of the drawings.

The craters or depressions 22 are preferably formed with an electron beam or a laser beam (not shown) described in some detail hereinafter. As initially formed, the depth of the crater is on the order of five microns and this depth is reduced when the roll surface receives a hard coating 23 (FIGS. 2 and 3) during step three of the surface finishing scheme. Such a coating can, for example, be a thin e.g. less than ten microns, dense chrome or similar material. Such a coating has been found to be effective in substantially reducing adhesion of rolled material 12 and 16 to the surfaces of rolls 18. And, because of the shallow depth and gentle slope of each depression 22 (less than 25°), micro-cutting action of the roll surface into the softer material of 12 and 16 is greatly minimized so that wear debris, which would then be picked up by the roll surface, is minimized. (In FIGS. 2 and 3, the direction of roll rotation and strip movement is shown by arrows 25.) Coating 23, in addition, helps to preserve roll surface texture so that frequent redressing of the rolls by grinding is unnecessary.

The spacing between successive craters 22, in both the rolling and transverse directions, is generally determined by the length through which the rolls contact the strip to be rolled in the roll bite, and the speed of the rolling process. The preferred spacing of craters in both directions is less than thirty percent of this contact length, this latter quantity being given approximately by $L_c$, where:

$$L_c = \sqrt{aRt_1} \tag{1}$$

where:
R = thickness reduction ratio, which is a ratio of the amount of strip reduction relative to the original thickness of the strip
a = roll radius in inches
$t_1$ = metal entry gauge in inches The size or span of the nominal crater diameter of each crater 22 is constrained by four factors. The first factor is the wear mechanism in the roll bite. From a wear standpoint, the lower the density and the smaller the nominal diameters of the craters, the lower is the rate of wear debris generation. The significance of small, shallow lipped, low density craters lies in the fact that the workpiece surface slides relative to the roll surface during rolling. Due to the reduction in thickness of the workpiece (i.e., due to volume constancy of plastic deformation) along the roll bite, the speed of the workpiece increases from its entry into the rolls to its exit from the rolls. This effect is particularly pronounced in the relatively high rolling speeds used to roll aluminum. There is a point within the roll bite known as the neutral point at which the velocities of the rolled material and the roll surface are identical. Prior to reaching this neutral point, the roll surface moves faster than the workpiece surface in the rolling direction. After the material of the workpiece crosses the neutral point, it moves faster than the roll surface. Because of this differential speed effect in the roll bite, the roll surface tends to smear the workpiece surface. Wear debris generation is thus proportional to the distance through which the roll surface smears the workpiece surface. In cold rolling, the smearing distance SD is given approximately as:

$$SD = \frac{\sqrt{aR^3 t_1}}{3(1-R)} \tag{2}$$

where the designations are the same as defined above in reference to Equation (1). There is no known counterpart to Equation (2) for hot rolling. However, the smearing distance SD for hot rolling is known to be proportional to the reduction ratio, the roll radius and the entry gauge of the material to be rolled.

Figure 4:
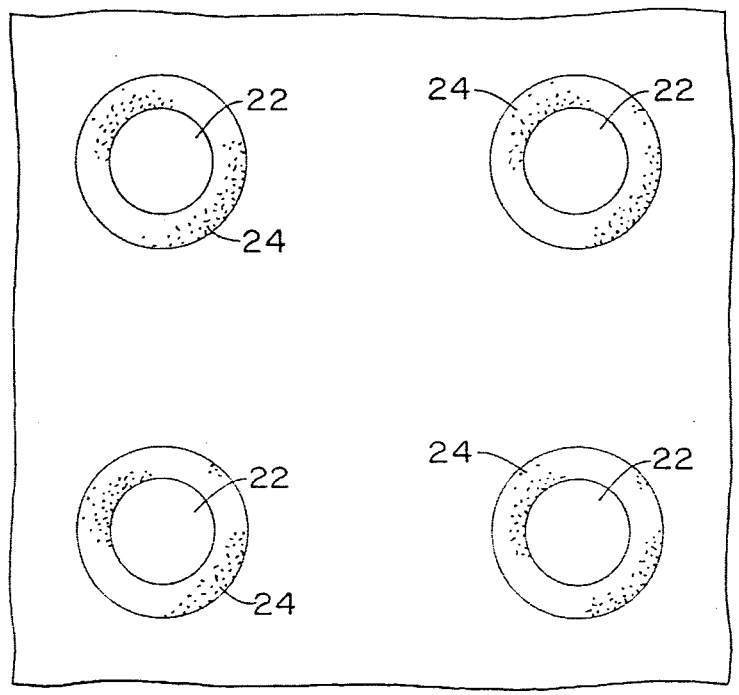
FIG. 4 is a plan view of the surface shown in FIG. 2.

Wear debris generation is also proportional to (1) the asperity (peak) count of peripheral deposits 24 (FIGS. 2 and 4) of roll material located along the banks of craters 22, (2) the asperity slope of 24 and (3) nominal roll surface roughness. In general, the higher the density of craters 22, the larger the slope of deposited material 24 and hence the higher the rate of wear debris generation.

The second factor that mitigates the size of craters 22 is the required amount of traction in the roll bite. The minimum size of the crater is constrained by the minimum traction needed to achieve necessary reductions in metal thickness. Higher rolling speeds, such as those in cold rolling operations, generate a thicker lubricant film in the roll bite. Therefore, relatively large craters or depressions at high density on the roll surface are preferable for purposes of providing adequate traction to prevent pure hydrodynamic or full film lubrication.

It is clear that the aforementioned two factors (i.e., small, low density craters versus larger, high density craters) work against each another in the roll bite, and a balance between the two must be achieved.

A third factor that constrains crater size is the wavelength and temporal profile of the focused laser beam or the width of the focused electron beam. Ideally, one should be able to micro-machine a crater diameter that matches the wavelength of the laser beam. In practice, one is limited to a small multiple of this value due to diffraction (e.g., when using a beam having a Gaussian or bell-shaped intensity profile), imperfect optics and beam stability. The wavelength of the beam also mitigates the amount of beam energy that is effectively absorbed in the surface plane of the roll. The temporal profile of the laser, which should generally be pulsed, mitigates the amount of energy which impinges upon the roll surface per unit time and hence the amount of energy which can be absorbed in that time. In addition, the overall shape and quality of the craters is controlled, in part, by the energy of the impinging beam, beam impingement angle and angle of gas assist, if such is needed.

The fourth factor that effects crater size is the resolution provided by the human eye. In the packaging industry, for example, the customers of metal sheet products generally prefer a uniform, smooth and shiny sheet surface, the surface having a texture that is not perceptible by the human eye. Therefore, the maximum diameter of a crater must not exceed 30.0 microns on the strip issuing from the final stand of a cold mill (a size not discernable by the human eye).

In hot rolling, there is no specified limit since the surface texture will be masked by subsequent rolling operations.

The surface textures applied during step two of the finishing process, as thus far described, can be made with a high degree of precision by use of a focused energy beam device (not shown), a preferred device being the Q-switched Nd:YAG laser discussed in the above-mentioned patent application Ser. No. 342,300. Such a laser offers flexible wavelength selection and thus one can process roll surface textures (craters) of differing widths and depths, as texture dimensions are directly related to the wavelength of the electromagnetic energy of the beam. This aspect is discussed in the above application, the details of which are incorporated herein by reference.

Another focused energy beam device capable of processing surface textures of the invention is an electron beam. Such a device provides a focused beam of particulate matter (i.e., electrons). An electron beam device has a particular advantage over most laser devices in that its processing speed is greater, as the light energy of a laser requires a small period of time to heat a surface prior to crater formation. The particulate matter of an electron beam forms the crater immediately, though it does possess a disadvantage over the laser device in that the roll and beam must be placed in a controlled environment, i.e., in a vacuum chamber, such a chamber being unnecessary with a laser.

Both devices can be controlled by a computer, which affords minimal variation in the application process.

With such consistent formation of craters in a roll surface, as provided by electronic control of the above mentioned focused energy beam devices, the present invention cares for the intricate interface physics of roll-to-roll surfaces and roll-to-strip surfaces in a manner that enhances traction while simultaneously minimizing wear debris generation during the total process of rolling metal, particularly light metals, such as aluminum and its alloys, from the breakdown stand to the final stand of a rolling mill from which the final rolled product exits.

The precise control and engineering of the textures of rolls can also be provided by certain chemical etching processes. For example, the roll can first be masked in an enclosure provided with precisely located and sized perforations. The roll is then rotated through a bath of a chemical etching compound, the precisely located and sized perforations allowing etching of the roll surface at the locations of the perforations. The etching compound removes roll surface material sufficient to create micron sized depressions. When the rotation is completed, the enclosure is removed from the roll, and the roll then coated with a hard dense material, as described in further detail below.

Such an etching process does not provide depressions 22 with peripheral deposits 24. Therefore, such a chemical etching process would be preferably used in the earlier stands of an integrated rolling process, i.e., in the latter stands of a hot rolling mill and the earlier stands of a cold rolling mill.

In step three of the surface finishing process, the ridge of deposited material 24 (FIGS. 2 and 4) around the banks of craters 22 is partially or substantially removed from those rolls to be used in the earliest stands of the rolling operations, i.e., those stands which involve hot rolling or the early stands of cold rolling. The process of removing deposited material involves either one or a combination of the following procedures: lapping, power brushing, chemical and electrochemical finishing, electropolishing, chemical polishing, or additional mechanical polishing procedures. Any remaining vapor deposited material is preferably no more than ten percent of the total vapor deposited material.

Figure 3:
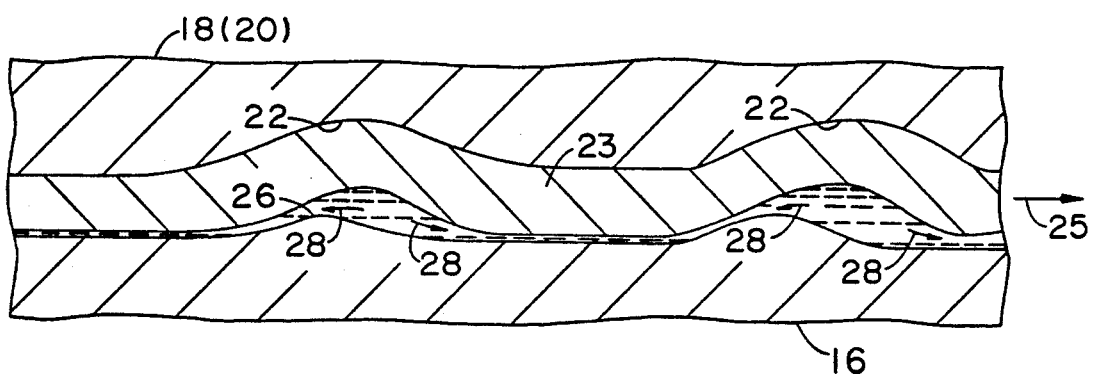
FIG. 3 is a cross sectional view of a portion of a roll surface for the latter stands of a hot mill or earlier stands of a cold mill.

FIG. 3 of the drawings shows in section two craters 22 formed in the surface of a mill roll. Peripheral depositions of roll material about the crater banks have been removed so that only the minute depressions of 22 remain. In removing the deposited material, wear debris generation is minimized since the potential for micro-asperity cutting or plowing of the rolled surface of 16 by the surface of roll 18 is minimized. Rather, as shown in FIG. 3, the edges of the depressions are relatively smooth so that the only impressions or prows (mounds) 26 made in the surface of rolled strip 16 are those in which strip material moves into depressions 22 to form micron-sized prows 26 of rolled material 16. This partial extrusion of rolled material 16 into craters 22 as 16 moves in the direction of arrow 25 in FIG. 3, provides extra traction to successfully conduct the rolling operation. In the course of partial extrusion, the rolled surface of strip 16 causes an expulsion of entrapped lubricant in the roll texture, as shown by arrows 28 in FIG. 3, thereby effectively re-lubricating the tooling-workpiece interface in the vicinity of mounds 26 and craters 22.

Through design of the roll texture micro-geometry and spacing of the texture, i.e., the depressions, as discussed above, a delicate balance between traction and the re-lubrication mechanism provides the necessary traction to achieve the required reduction in the rolling operation while at the same time reducing wear and adhesion of rolled material to the roll surface through consistent re-lubrication of the interface. These prows or mounds are removed and or smeared from the rolled surface of strip 16 in subsequent rolling operations such that when the strip reaches the final stand of the cold rolling operation, the surface of the sheet can be prepared to customer specifications by work rolls used in the final stand 3 that have their own micro-engineered surfaces necessarily differing from those surfaces applied to rolls used in previous stands.

The micro-geometry of the craters 22 and their frequency on the roll surface is controlled for the purpose at hand. For example, traction and lubrication in a breakdown mill is peculiar to the breakdown process and thus different from traction and lubrication in other rolling processes. The size (i.e., depth and width) and frequency of the craters must be chosen according to the requirements of the particular stand and rolling process.

Figure 2:
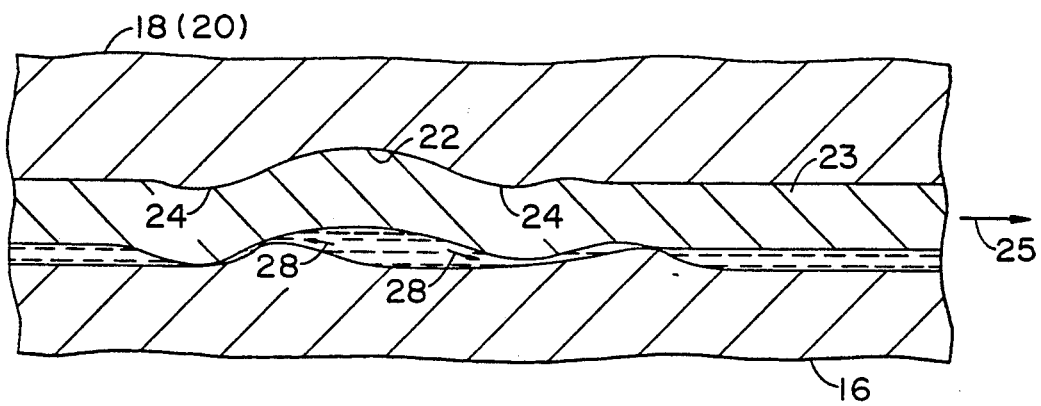
FIG. 2 is a cross sectional view of a portion of a roll surface for earlier stands of a hot rolling mill and the last stand of a cold mill.

FIG. 2 of the drawings shows a roll section provided with a crater 22 having a doughnut-shaped (FIG. 4) deposit of roll material 24 located about the crater bank. As mentioned earlier, the peripheral outside slope of the deposited material can be reduced by light polishing or buffing of the roll surface since it does not form a strong metallurgical bond to the unprocessed roll surface. What remains after its reduction is a gentle raised portion located along the periphery of the crater. The raised portion consists of a re-solidified portion of the original deposit, i.e., the re-solidified portion was melted instead of being evaporated by the impact of the crater forming beam. The slope of this remaining raised portion should be no more than 25° relative to the nominal surface of the roll. In this manner, the raised portion does not dislodge from the roll surface or significantly micro-machine the surface of the rolled material to generate unacceptable levels of wear debris. At the same time, the raised portions of the craters form doughnut-shaped depressions in the softer workpiece material being rolled (i.e., softer than the steel rolls), which depressions provide lubricant traps to enhance lubrication in future forming operations involving the rolled strip.

Further, the raised peripheral portions 24 of the craters 22 enhance traction between the strip and work rolls to effect desired reductions in the thickness of the strip being rolled, while simultaneously controlling frictional forces and the wear mechanism in the roll bite.

With the craters thus formed, along with annular raised portions 24, where used, each backup and work roll is coated with a hard dense material. A material that has been found suitable for this purpose is a thin layer of dense chrome.

The coated low profiles of the roll, as depicted in FIG. 3 of the drawings, for example, are highly wear resistant, as the raised portions 24 have low stress concentration upon contact with the surface material of strip 16 or backup roll surface, there being no significant peaks of roll material to be worked and broken. The profile in FIG. 3 of the drawings, of course, has no peripheral raised portions around the craters such that the roll is smooth to within a 0.1 micron range, the craters having a depth on the order of three microns.

In the final analysis, friction, lubrication and wear in the entire rolling process is controlled in a manner heretofore unknown.

While the invention has been described in terms of preferred embodiments, the claims appended hereto are intended to encompass all embodiments which fall within the spirit of the invention.

What is claimed is:

1. A method of rolling metal material in a plurality of rolling stands, with each stand having two or more metal rolls including work rolls, comprising:
   a pre-preparation step in which the surfaces of said rolls are polished to a mirror finish,
   a direct processing step in which the mirror surfaces are textured with a plurality of non-random spaced apart minute micron size depressions, the spacing f said depressions being less than thirty percent of the length through which the work rolls contact the metal material in the direction of rolling,
   a post-preparation step in which material deposited around the depression by the texturing step is removed such that any material remaining about the depressions has an outside slope angle no greater than 25° with respect to the nominal mirror surface of the roll,
   coating the textured roll surfaces with a hard, dense material,
   providing the roll surfaces with a lubricant,
   directing metal material through the plurality of stands, said craters being capable of retaining and carrying lubricant into the bites of all of the rolls of the stands without substantial adherence of the metal material to the roll surfaces, and without substantial generation of wear debris on the surfaces of the rolls and rolled metal material, and
   maintaining a compressive force on said metal material between the work rolls to reduce substantially the thickness of the metal material.

2. The method of claim 1 including:
   using a chemical etching process to form said depressions.

3. The method of claim 1 including:
   providing means capable of producing a narrow beam of energy,
   producing said narrow beam of energy,
   directing said beam to said roll surfaces, and
   forming said depressions with said beam.

4. The method of claim 3 including:
   utilizing an electron beam device to provide said narrow beam of energy.

5. The method of claim 3 including:
   providing a laser device,
   using said laser device to provide said narrow beam of energy.

6. A method of rolling metal in a plurality of rolling stands having a plurality of metal rolls, comprising:
   a pre-preparation step in which the surfaces of said rolls are polished to a mirror finish,
   a direct processing step in which the polished surfaces of the rolls of earlier stands and intermediate stands of the plurality are provided with non-random, discrete, minute, micron size craters,
   providing the rolls of the final stand or stands of the plurality of stands with a surface texture tailored to the purposes of the end use of the rolled metal,
   coating the rolls of the earlier, intermediate and final stands with a hard dense material,
   directing the metal through the plurality of stands,
   maintaining a compressive force on the metal in said stands to reduce substantially the thickness of the metal in the stands, and
   using said craters to retain and carry lubricant into the bites of all of the rolls such that substantial reductions in the thickness of the metal can be taken at relatively high speeds without substantial adherence of the metal to the roll surfaces, and without substantial generation of wear debris on the surfaces of the rolls and rolled metal.

7. A method of preparing the surfaces of the rolls of the stands of a rolling operation with textures adapted to the rolling idiosyncrasies of each of said stands, the method comprising:
   a pre-preparation step of polishing the surfaces of the rolls to a mirror finish,
   a direct processing step of providing the polished roll surfaces in each stand with non-random spaced apart micron-size craters before said surfaces are coated with a hard, dense material, the dimensions of and distances between the craters being adapted to the lubrication, friction, and traction requirements of a given stand after the surfaces are coated with the hard dense material, and
   coating the roll surfaces with a hard dense material,
   said coated craters being able to retain lubricant and carry the same into the bites of all of the rolls of a given stand, without substantial back extrusion of material into the craters, and without substantial generation of wear debris on the surfaces of the rolls and rolled material.

8. A method of preparing roll surfaces for rolling metal rolling mills, comprising:
   as pre-preparation step of polishing the roll surfaces to a mirror finish,
   a direct processing step of forming discrete, non-random, minute, micron size craters in the mirror finish of said roll surfaces, the forming of said craters tending to locate surface metal about the peripheries of the craters because of the metal of the rolls being melted and metal vapor generated and deposited during the crater forming process, removing said vapor deposited metal from said peripheries by a light polishing step that leaves melted metal in place in said peripheries, and coating the roll surfaces with a hard, dense material after the craters are formed and after the vapor deposited metal is removed.

9. The method of claim 8 in which the step of removing the deposited metal is accomplished by lapping the roll surface with a lapping compound.

10. A method of preparing the surfaces of the rolls of a plurality of stands for rolling aluminum metal when said metal is directed through certain of said stands at high relative speeds, the method comprising:

polishing the surfaces of said rolls to a mirror finish, texturing the polished surfaces of the rolls of the earlier stands with discrete, non-random, minute, micron size indentations, texturing at least one of the work rolls of a final stand of the plurality of stands with a surface finish tailored to the purposes of the end use or uses of the rolled metal, and coating the rolls of all of the stands with a hard dense material, said coated textured surfaces being capable of retaining the carrying lubricant into the bites of all of the rolls such that substantial reductions in the thickness of the metal can be taken in said stands with substantially no back extrusion of rolled metal into the indentations, and with substantially no generation of wear debris on the surfaces of the rolls and rolled metal.

* * * * *